No. 712,819. Patented Nov. 4, 1902.
M. G. LIPPINCOTT.
SAFETY PIN.
(Application filed May 31, 1902.)

(No Model.)

Witnesses
P. H. Nagle.
L. Houville.

Inventor
Marie Gregg Lippincott
By Diedersheim & Fairbanks,
Attorneys

UNITED STATES PATENT OFFICE.

MARIE GREGG LIPPINCOTT, OF PHILADELPHIA, PENNSYLVANIA.

SAFETY-PIN.

SPECIFICATION forming part of Letters Patent No. 712,819, dated November 4, 1902.

Application filed May 31, 1902. Serial No. 109,590. (No model.)

*To all whom it may concern:*

Be it known that I, MARIE GREGG LIPPINCOTT, a citizen of the United States, residing in the city and county of Philadelphia, State of Pennsylvania, have invented a new and useful Improvement in Safety-Pins, of which the following is a specification.

My invention consists of an improvement in a safety-pin, the object being to provide a construction that insures interlocking of the pin proper with the sheath and which also provides against the accidental disengagement of said parts.

Figure 1:
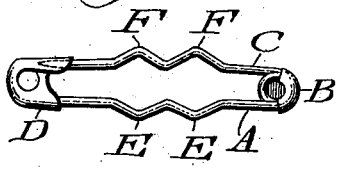
Figure 2:
Figure 3:
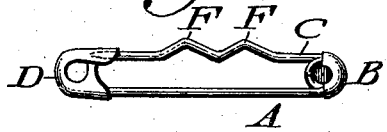

Figure 1 represents a plan view of a safety-pin constructed in accordance with my invention. Fig. 2 represents an edge view of a modified construction thereof. Fig. 3 represents a plan view of still another embodiment of my invention.

Similar letters of reference indicate corresponding parts in the figures.

Referring to Fig. 1 of the drawings, A designates the shank of the pin; B, the usual spring-coil; C, the pin proper, and D the sheath. In said Fig. 1 I have shown the shank A as provided with deflected portions E, formed by bending the intermediate portion thereof in zigzag direction, while the pin proper, C, is provided with the deflected portions F. By bending the shank and the pin proper in the manner shown I find that the rigidity of the same is increased, or, in other words, that they possess less resiliency, so that the tendency to bend is reduced, likewise reducing the tendency of the point of the pin to be disengaged accidentally from the sheath. This tendency in the ordinary straight or curved pin is most apparent when a strain is placed upon the same, so that it will bend and withdraw the pointed end from the sheath. It will also be noted that the deflected portions are located outside of the ordinary plane in which the pin and shank extend—that is to say, the deflections are to the outside of the axis of the pin.

In Fig. 2 I have shown a modification of my invention, which consists in deflecting the pin laterally, as shown at G.

The modification shown in Fig. 3 differs from that shown in Fig. 1 in that the shank A is straight or of the usual form.

Having thus described my invention, what I claim as new, and desire to secure by Letters Patent, is—

1. A safety-pin provided with a pin proper having integral coil and shank and having between the ends thereof indentations, each consisting of a deflection at an angle to the line through the ends of the pin and the succeeding deflection back to said line, said indentations being in a plane outside of the plane through the pin and shank.

2. A safety-pin provided with a pin proper having integral coil and shank, said shank and pin proper each having between the ends thereof indentations, each indentation consisting of a deflection at an angle to the line through the ends of the pin and the succeeding deflection back to said line.

MARIE GREGG LIPPINCOTT.

Witnesses:
JOHN A. WIEDERSHEIM,
HARRY COBB KENNEDY.